US008240573B2

(12) United States Patent
Cardozo Martinez

(10) Patent No.: US 8,240,573 B2
(45) Date of Patent: Aug. 14, 2012

(54) CONTAINER FOR ELECTRONIC DEVICE THAT ALLOWS MULTIPLE FUNCTIONS OVER A VENDING MACHINE

(75) Inventor: Alvaro Alejandro Cardozo Martinez, Montevideo (UY)

(73) Assignee: Pranasys S.A. (UY)

(*) Notice: Subject to any disclaimer, the term of this patent is extended or adjusted under 35 U.S.C. 154(b) by 633 days.

(21) Appl. No.: 12/343,887

(22) Filed: Dec. 24, 2008

(65) Prior Publication Data

US 2009/0236953 A1 Sep. 24, 2009

(30) Foreign Application Priority Data

Dec. 28, 2007 (UY) ........................................ U4208

(51) Int. Cl.
*G06K 13/06* (2006.01)

(52) U.S. Cl. ........................................ 235/483; 235/379

(58) Field of Classification Search .................. 235/379, 235/380, 483

See application file for complete search history.

(56) References Cited

U.S. PATENT DOCUMENTS

| | | | | |
|---|---|---|---|---|
| 5,823,386 | A | 10/1998 | Vandenberg | |
| 5,850,075 | A * | 12/1998 | Brannan et al. | 235/379 |
| 6,505,095 | B1 | 1/2003 | Kolls | |
| 6,571,150 | B2 | 5/2003 | Arai et al. | |
| 6,584,309 | B1 | 6/2003 | Whigham | |
| 6,675,067 | B2 | 1/2004 | Blad | |
| 6,820,816 | B1 | 11/2004 | Reid | |
| 6,917,853 | B2 | 7/2005 | Chirnomas | |
| 6,925,335 | B2 | 8/2005 | May et al. | |
| 7,076,329 | B1 | 7/2006 | Kolls | |
| 7,353,080 | B2 | 4/2008 | Walker | |
| 2007/0203836 | A1 | 8/2007 | Dodin | |
| 2009/0164043 | A1 | 6/2009 | Martinez et al. | |
| 2009/0177319 | A1 | 7/2009 | Garibaldi et al. | |

FOREIGN PATENT DOCUMENTS

| | | | |
|---|---|---|---|
| ES | 2190878 | B1 | 1/2006 |
| MX | 2469 | | 7/2011 |
| UY | 30685 | A1 | 8/2009 |

OTHER PUBLICATIONS

MDB Protocol, Multi-Drop Bus/Internal Communication Protocol, MDB/ICP, National Automatic Merchandising Association (NAMA), Version 3.0, Mar. 26, 2003.
EVA-DTS Protocol, Data Transfer Standard, European Vending Association (EVA), Version 6.0, May 2004.
EVA-CVS Protocol, Cashless Vending Specification, European Vending Association (EVA), Version 1.2, Feb. 2001.
EVS-DTS, Appendix B—Manufacturer Codes, Version 6.1, May 15, 2008, pp. 1-6.
EVA-DTS, Appendix C—The Event List, Version 6.1, Apr. 2008, pp. 1-28.

* cited by examiner

*Primary Examiner* — Karl D Frech
(74) *Attorney, Agent, or Firm* — Kilpatrick Townsend & Stockton LLP

(57) ABSTRACT

A holding device which holds components of an electronic device, which is able to perform multiple functions on a vending machine is described. The device safely holds the components to ensure their proper performance even under hostile conditions. In one embodiment the holder includes a support for the printer paper, a lower back cover, an upper back cover, a main body and an anti-vandal front panel. The anti-vandal front panel protects the inner components from attack from the outside. The device also provides a display and permits the issuance of printed tickets.

8 Claims, 11 Drawing Sheets

CONTAINER FOR ELECTRONIC DEVICE THAT ALLOWS MULTIPLE FUNCTIONS OVER A VENDING MACHINE

The product whose authorship and patentability are hereby claimed consists of a holding device which holds the different components comprising an electronic device, fit to perform multiple functions on a vending machine (hereinafter "the electronic device").

The main function of this product is to safely hold its internal components, so as to ensure their proper performance, even under any "hostile" conditions to which the dispenser might be subject.

The product is also an interface: its visible front face features an electronic display and permits issuing printed tickets.

BACKGROUND OF THE INVENTION

There are two widespread protocols of use concerning the operation of vending machines: the MDB protocol, issued by the NAMA (See MDB Protocol. Muti-Drop Bus/Internal Communication Protocol. MDB/ICP. NAMA (National Automatic Merchandising Association). Version 3.0, 26 Mar. 2003), which consists of a voluntary standard with a high acceptance level, and which regulates the communication between the machine controller and the different peripherals coexisting with it, such as coin mechanisms, bill validators, and peripherals which do not use cash, such as credit card readers ("cashless devices"). The remaining one is the DEX/UCS protocol, issued by EVA (See EVA-DTS Protocol. Data Transfer Standard. EVA (European Vending Association). Version 6.0, May 2004). It also consists of a voluntary, comprehensive standard, widely used by vending machines. It defines how the communication should be established between the controller of one of the machines and another device, so that the first one conveys to the second data referred to sales, alarms and diverse types of events. In addition, both NAMA and EVA issue other standard documents which regulate other aspects related to vending machines. This is particularly important since dimensional aspects are thereby standardized. (See EVA-CVS Protocol. Cashless Vending Specification. EVA (European Vending Association), Version 1.2, February 2001.)

DESCRIPTION OF THE INVENTION

Figure 1A:
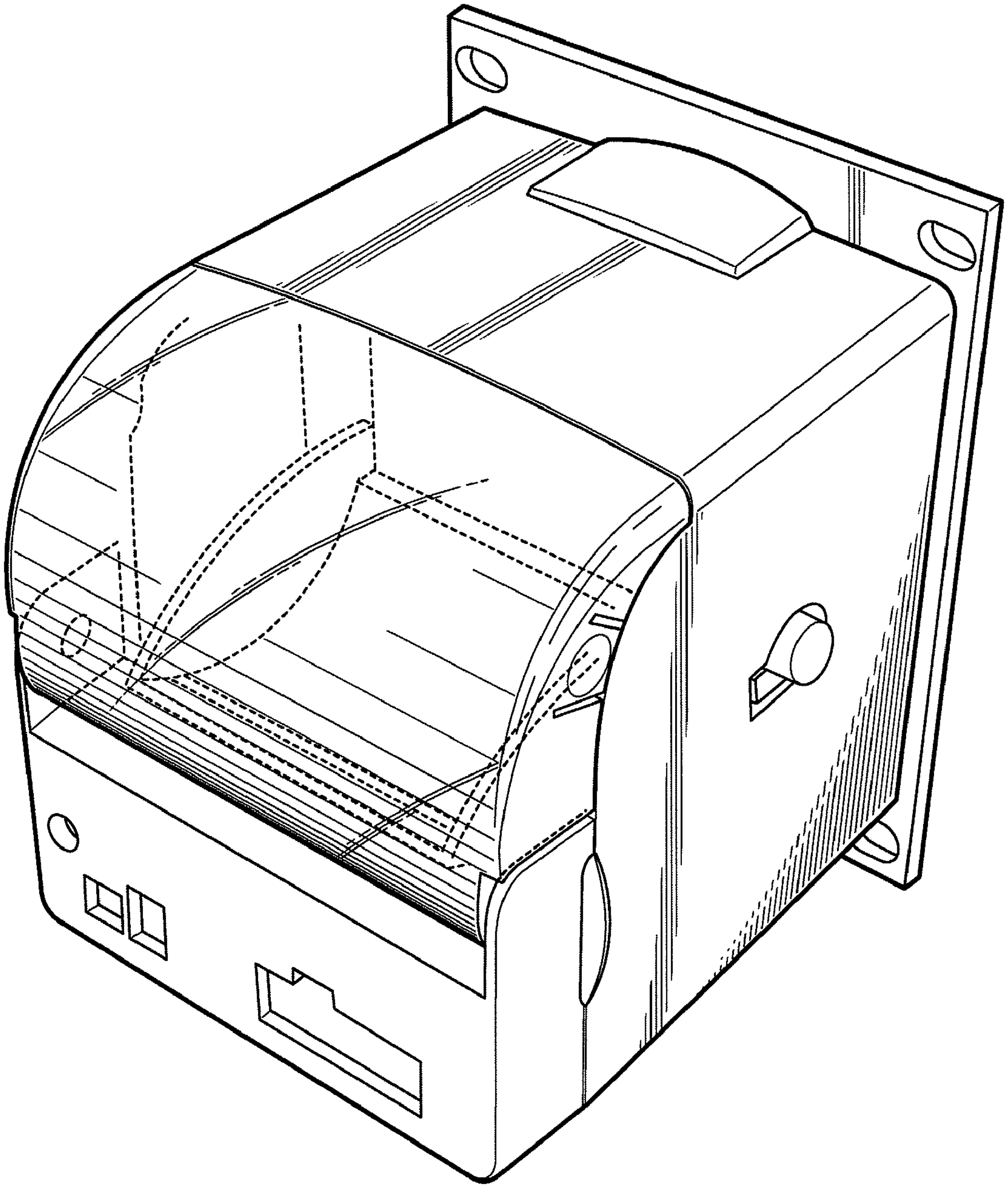
FIG. 1A illustrates a holder that includes a container which holds the different components of the electronic device, in accordance with an embodiment of the invention.
Figure 2A:
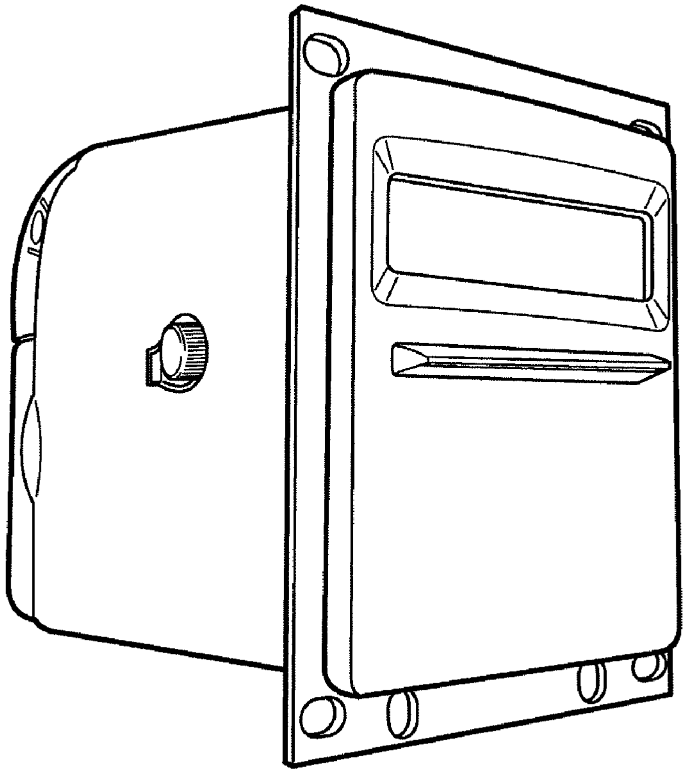
FIG. 2A illustrates the electronic device and the holder of FIG. 1A, in accordance with an embodiment of the invention.
Figure 2B:
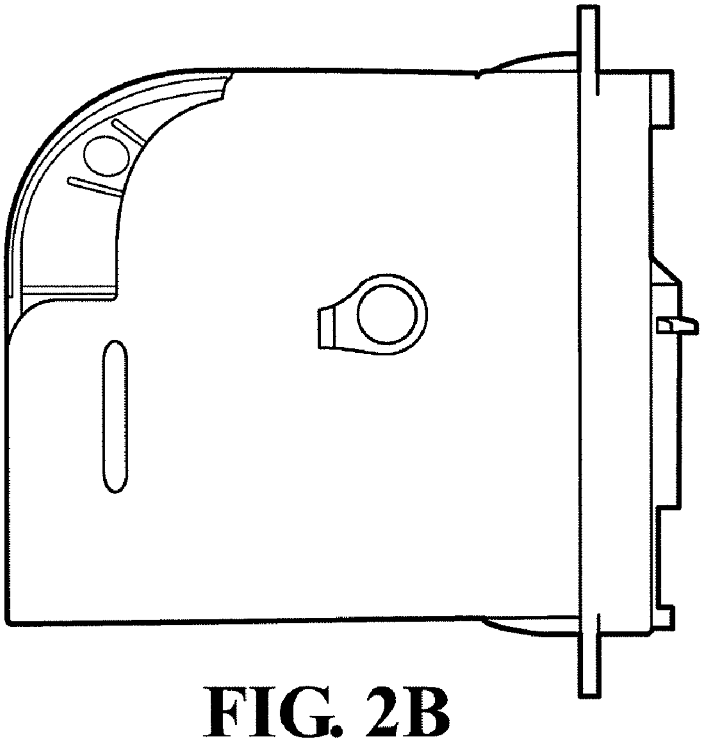
FIG. 2B illustrates the electronic device and the holder of FIG. 1A, in accordance with an embodiment of the invention.
Figure 3:
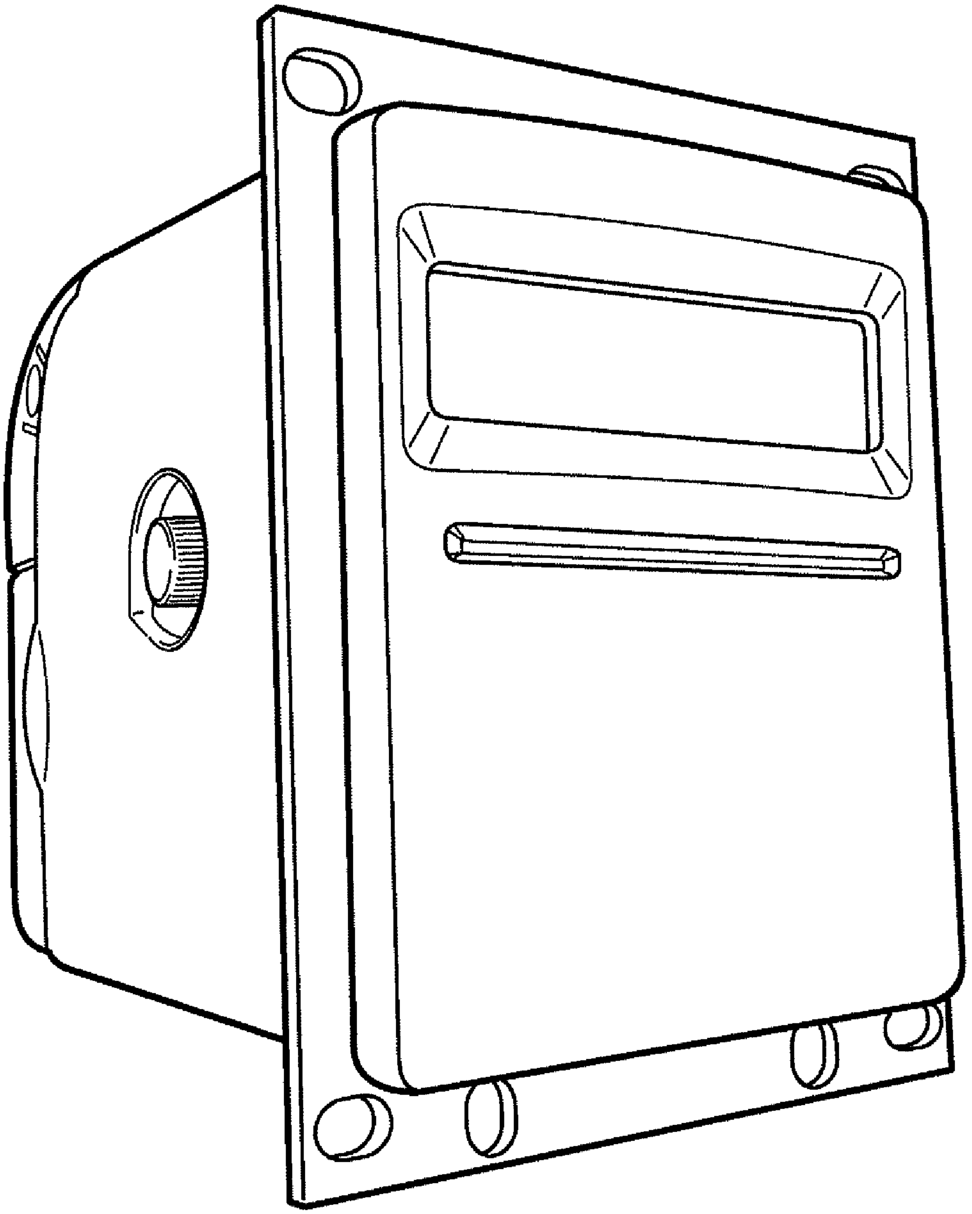
FIG. 3 illustrates the electronic device and the holder of FIG. 1A, in accordance with an embodiment of the invention.

The holder (FIGS. 1A and 1B) consists of a container which holds the different components comprising the electronic device (FIGS. 2A, 2B, and 3), namely: a mother board (FIG. 4, 410), an optional child board, an antenna (FIG. 4, 408), an LCD display (FIG. 4, 404), a thermal printer (FIG. 4, 402), and wiring.

The electronic device is attached to the frontal face of a vending machine (hereinafter "VM") and is visible to the public. According to the nomenclature established by the MDB protocol the electronic device is a "cashless device" with unique design features which are described in pending patent number UY/30685, "New electronic device for the sale of intangible products through vending machines".

The innovative outer design of the container takes into account the diverse situations of use and space constraints within the VM, as well as the relationship between the holder and the operators who are to handle it. It complies with the specifications established in the EVA-CVS Protocol, specifically with the dimensional parameters for the VM's front opening, interior part, position of the holder, as well as with installation regulations.

Composed of five pieces which can be easily embedded to each other, the holder is resistant and requires low maintenance. Replacement and fixing, if needed, are simple, and do not require complex maneuvering or specialized tools.

The above-mentioned pieces are the following:

1) The support for the printer paper (FIG. 5, 501) is a tray-like piece which is screwed to the printer. It consists of a base where the paper roll rests, as well as side parts which indicate the place where it must be inserted at the printer mouth, thus constituting a sort of "guide" which facilitates paper insertion.

2) A lower back cover (FIG. 5, 502) which is embedded through lateral, lower clips (FIG. 1B, 101, 102) to the main body (FIG. 5, 504), in a screw-less union which can be disassembled. The sockets are in the inside and cannot be seen from the outside.

Figure 1B:
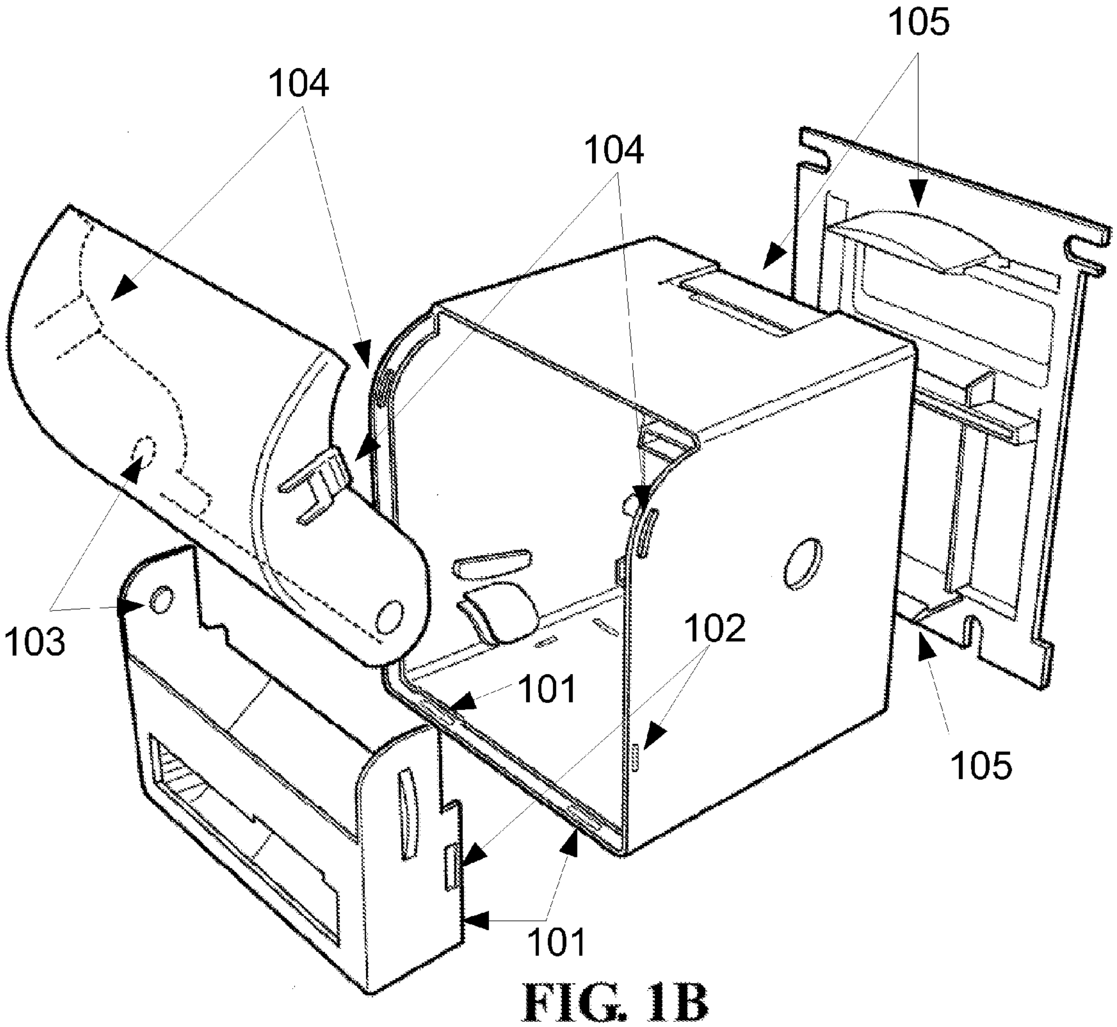
FIG. 1B illustrates an exploded view of the holder of FIG. 1A, in accordance with an embodiment of the invention.

It has two reinforced lateral vanes in the outer face, with clips for the fixation and pivoting of the upper back cover (FIG. 1B, 103).

The mother board is fixed to this piece through plastic rivets, starting from the base.

3) A transparent upper back cover (FIG. 5, 503) which is embedded through holes into the above-mentioned clips of the lower back cover, on which it can pivot (FIG. 1B, 103), thus enabling easy opening for paper replacement. Two lateral holes (FIG. 1B, 104) are used to fasten the cover to the main body of the holder (FIG. 5, 504), thus offering a safe closing system.

Finger slots (FIG. 1B, 104) indicate where to exert pressure for opening.

Its transparent material permits seeing the remaining quantity of paper without need to open the holder.

Figure 5:
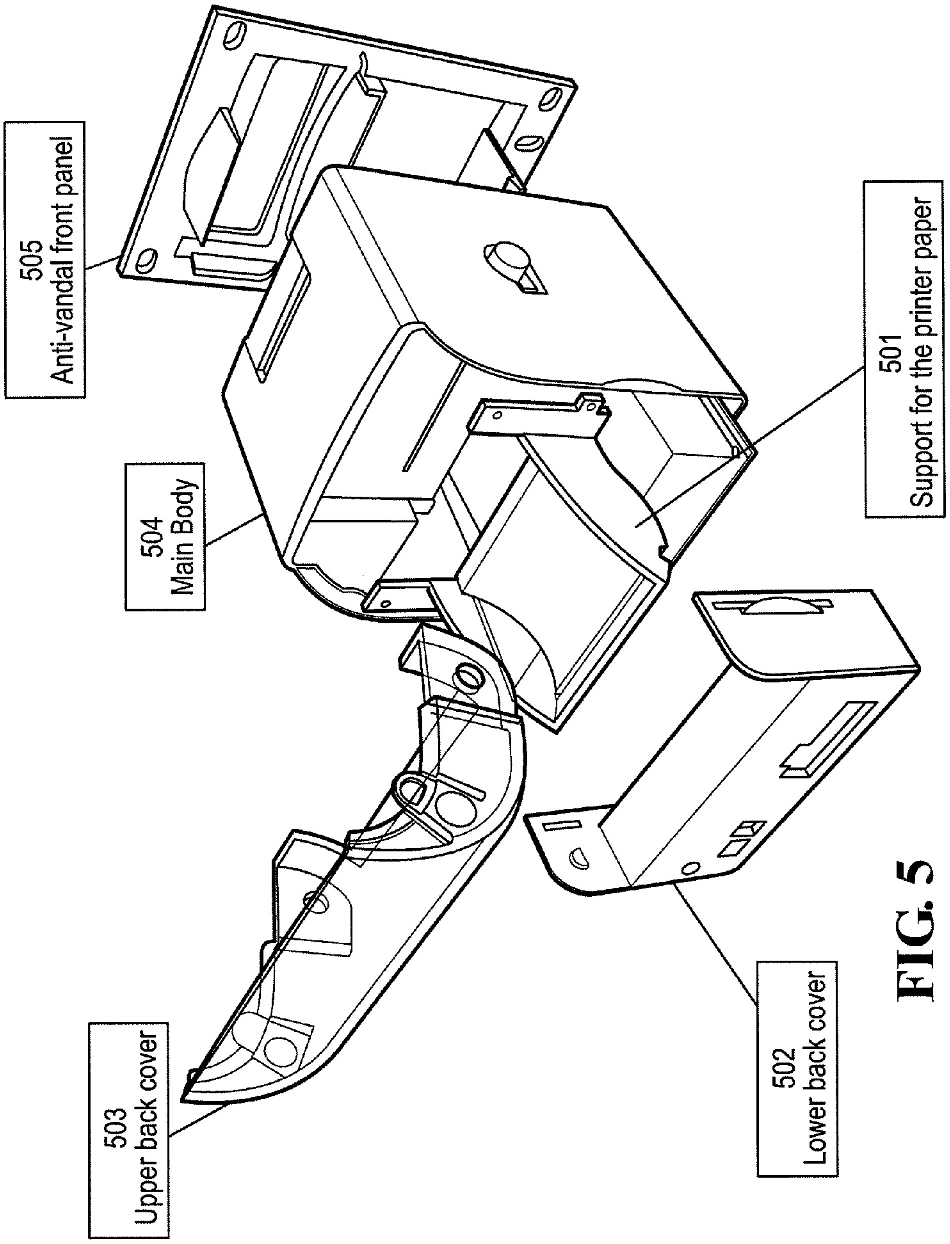
FIG. 5 illustrates an exploded view of the holder, in accordance with an embodiment of the invention.

4) The main body (FIG. 5, 504) at the center of the holder consists of a piece which protects and holds all the internal components. It is fixed through clip sockets (FIG. 1B, 101, 102, 104) to the back covers and the anti-vandal front panel (FIG. 5, 505). The union between the main body and the anti-vandal front panel (FIG. 1B, 105) is designed so as to support the full weight of the main body (including all the internal components).

5) The anti-vandal front panel (FIG. 5, 505) is the frontal piece of the holder, and the consumer interface. It is placed inside the VM, to which it is fixed through the threaded bolts specified in the EVA-CVS Protocol.

It is a tray-like piece, with lateral sides approximately 15 mm deep, and a rounded front part which makes it very stiff.

This piece must be made of highly resilient plastic, e.g. polycarbonate, at least 3.5 mm thick.

The material used for manufacturing the first four pieces must provide a proper balance between robustness and cost (e.g. ABS).

Functional Aspects

The protection of the inner components of the holder is guaranteed by the original design of its anti-vandal front panel, which is able to withstand attacks or aggressions (blows, etc.) from the outside. Should there be any, the holder protects its internal components in such a way that they neither get out of place, nor get unswitched, get broken or are affected in their normal functioning.

Figure 6:
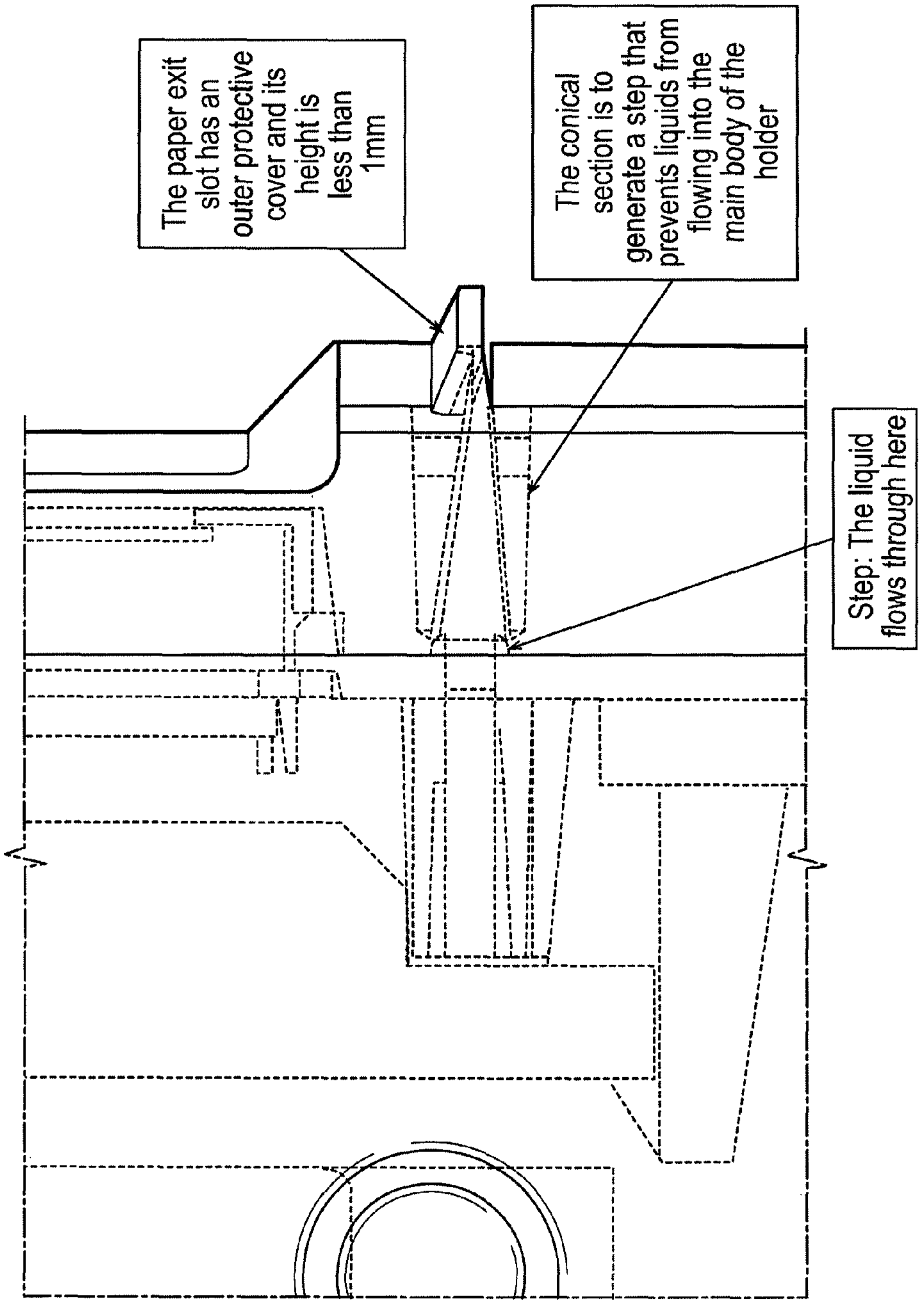
FIG. 6 illustrates the frontal protection cover, in accordance with an embodiment of the invention.

In addition, the electronic components in the interior of the holder are electronically isolated, since their innovative design prevents the holder itself to act as a conductor. In order to prevent the introduction of foreign objects, which might damage any of the internal components of produce malfunctioning in the electronic device, the outer protective cover and design of the paper exit slot of the anti-vandal front panel prevent the entrance of rigid objects more than 1 mm thick (e.g. coins), and also of dust and rain. Likewise, frontal or ascending accidental/intentional splashes of liquids on the paper exit slot can not harm any of the internal elements of the holder, since the paper channel consists of two unaligned conic sections which prevent liquids from flowing into the main body of the holder (FIG. 6).

Figure 4:
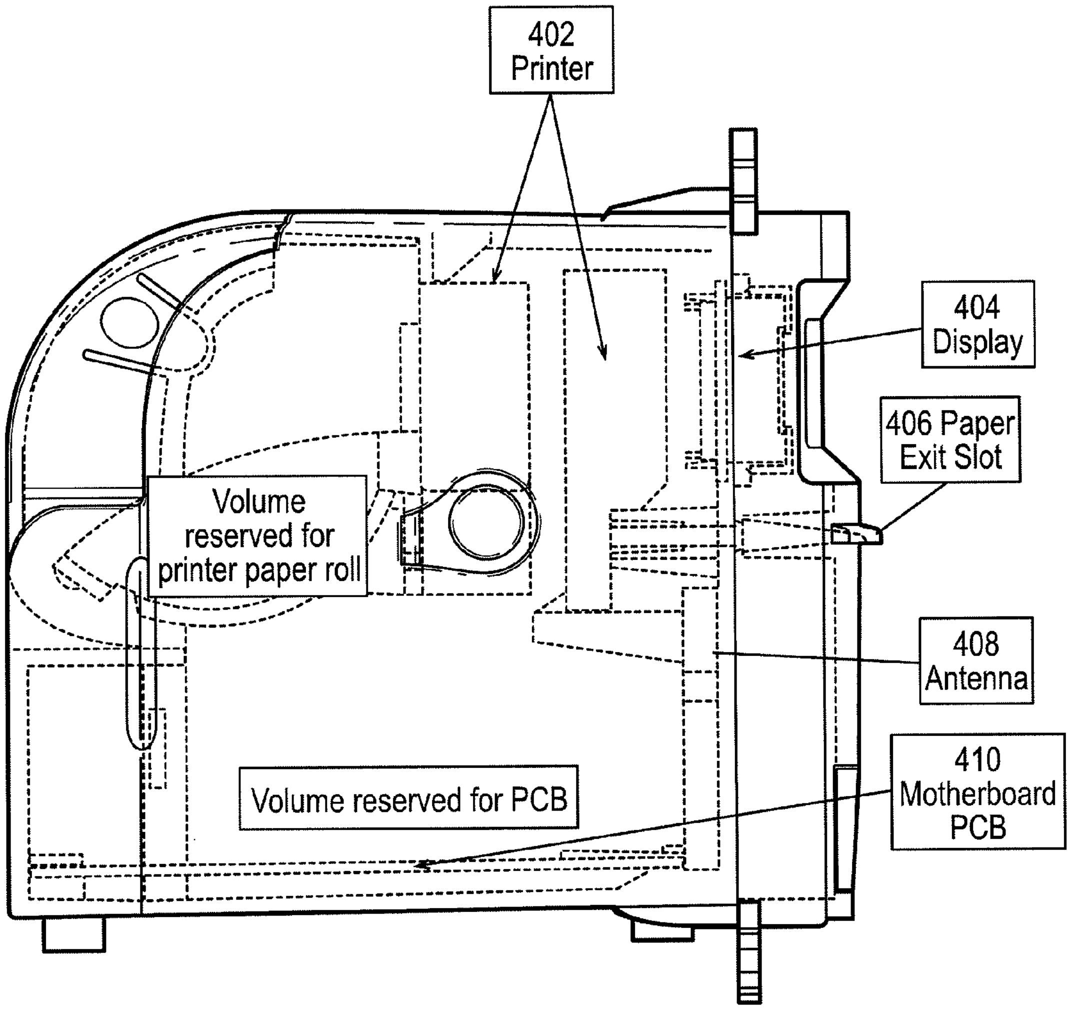
FIG. 4 illustrates a side view of the components of the electronic device and the holder, in accordance with an embodiment of the invention.

The location of the inner components is functional, both for the assembly of the electronic device and for the standard maintenance tasks. The components, safely located within the holder, do not disturb each other, and so wiring tasks can be easily and securely performed among them. Specially, the location of the mother board 410 is such that the board does not move, neither when its back side is plugged/unplugged, nor when the electronic device is shaken or any of the components of its upper part are plugged or unplugged (FIG. 4).

The mother board has four holes in its corners, and is fixed by means of plastic rivets inserted from the outside. There is a free space of up to 27 mm above the board, which may be used to insert a child board or other electronic components (see FIG. 4).

Since the structure of a VM is usually metallic, the antenna transmission and reception occurs mainly through the opening where the anti-vandal front panel of the holder is located. For this reason the materials used in the front panel of the holder are required not to be metallic. In order to optimize the antenna performance and guarantee its proper protection, the holder is designed so that the antenna 408 is placed in its inner frontal and central part (FIG. 4).

The electronic device can be easily installed and maintained. There is no possibility of accidental breakage of the device or of any of its components during these tasks.

Figure 7A:
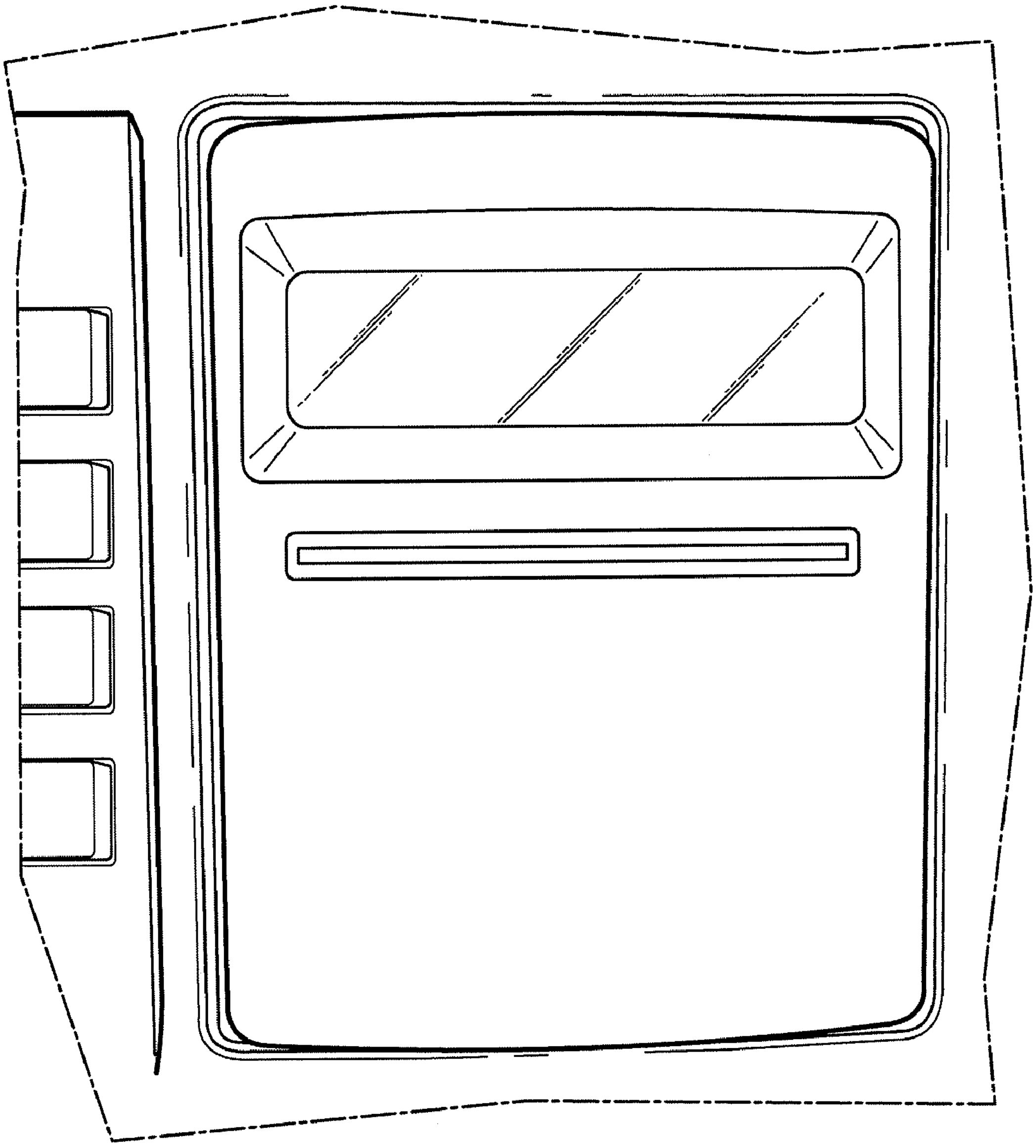
FIG. 7A illustrates the anti-vandal front panel installed in a vending machine, in accordance with an embodiment of the invention.
Figure 7B:
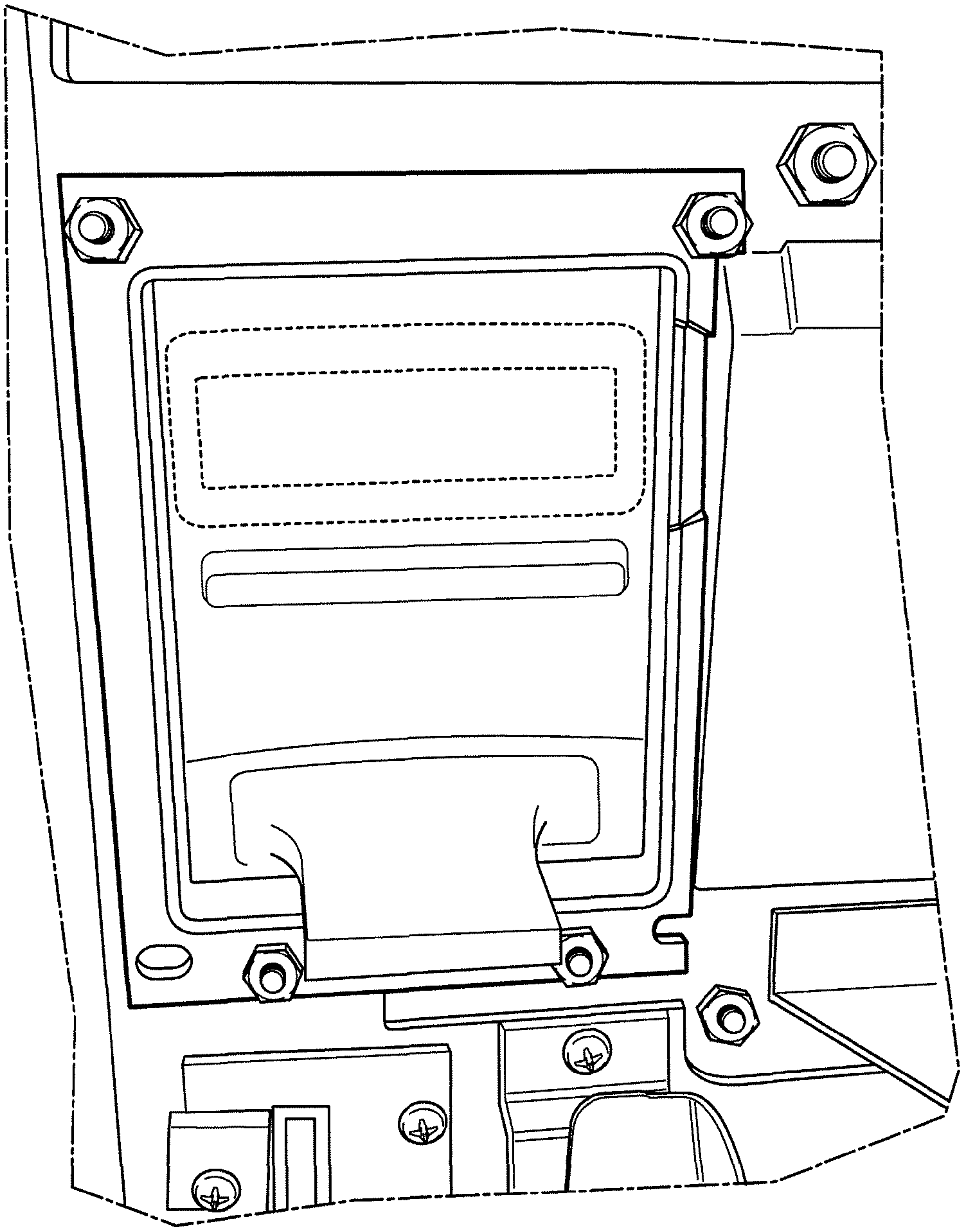
FIG. 7B illustrates the anti-vandal front panel installed in a vending machine, in accordance with an embodiment of the invention.

Habitual maintenance tasks—such as paper replacement—have been optimized and streamlined. Likewise, the independence of the anti-vandal front panel in relation to the main body permits its easy replacement, making removal unnecessary. In fact, the main body of the holder can be previously placed in front of the anti-vandal front panel, during the process of assembly of the electronic device, or, as an alternative, the anti-vandal front panel can be first placed in the VM, and then the rest of the device can be placed in its site by means of a simple "click" (FIGS. 7A and 7B).

Figure 8:
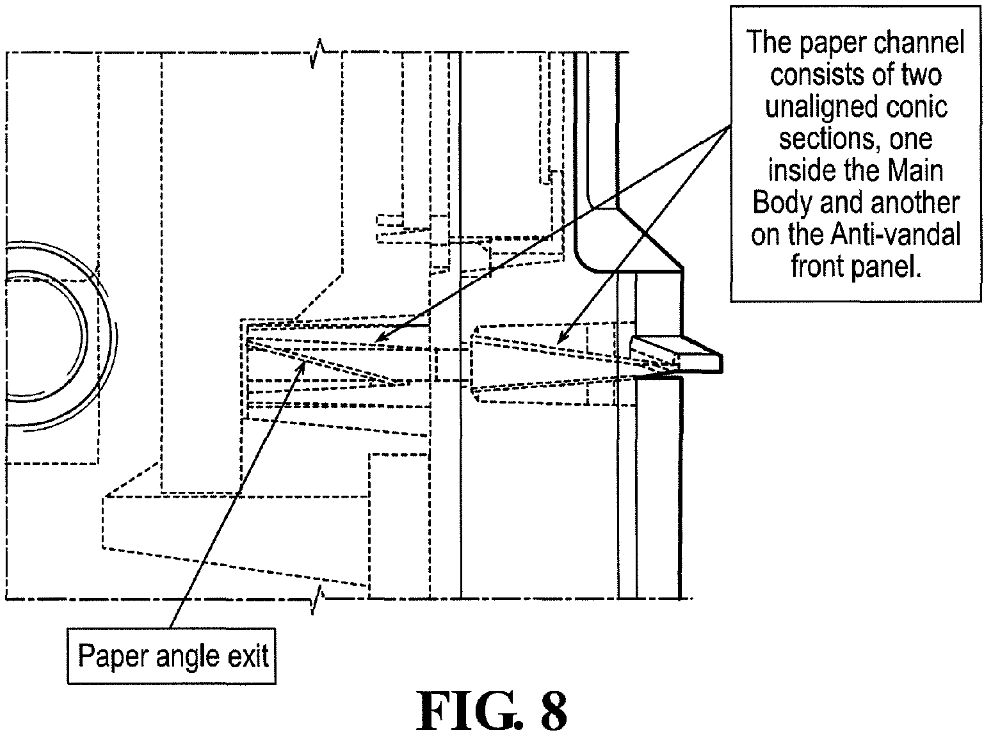
FIG. 8 illustrates the paper exit system, in accordance with an embodiment of the invention.
Figure 9:
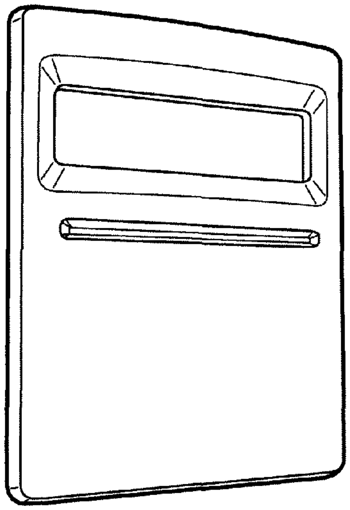
FIG. 9 illustrates one view of the electronic device installed in a vending machine, in accordance with an embodiment of the invention.

The holder provides a wholly reliable guide for the paper, from entry to exit in the frontal part of the holder. This is a very significant aspect, since stuck paper might cause malfunctioning in the electronic device (FIG. 8).

The replacement of the printer paper roll is a simple process, done through the upper back cover. Since there is little space inside the VM for inserting the paper, the holder provides a guide which facilitates the process. With this help, the operator simply puts the paper at the printer mouth, and the printer automatically inserts it. As an alternative, a hole located at the lateral side of the main body allows access to the manual paper insertion function.

Lastly, it must be highlighted that the transparent material permits seeing the remaining quantity of paper needless to open the holder.

The process of assembly of the electronic device is simple and fast, mainly because very few fixation elements are used therefor: 2 screws to fix the printer paper support to the printer itself, 4 screws to fix the anti-vandal front panel to the VM and 4 plastic rivets to fix the mother board in position.

The holder enables a correct communication of the interface between the electronic device and the consumer, by properly labeling the functions of the electronic device: location of the electronic display, ticket exit areas, etc.

Lastly, the holder can be used as a VM's fixed and independent unit, since its innovative outer design makes it possible to use it also as a "counter unit". This is achieved by simply replacing the anti-vandal front panel by a front panel which complies with the requirements—mainly the aesthetic ones—corresponding to said mode.

Figure 10A:
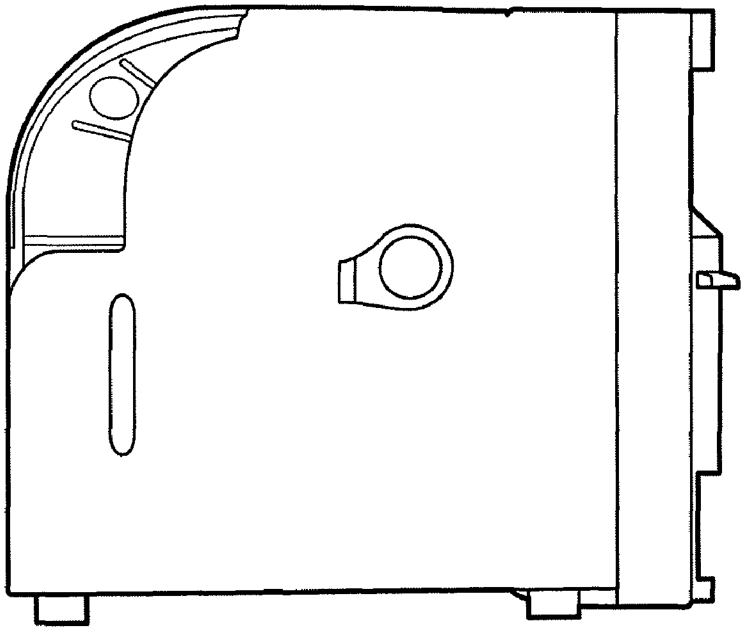
FIG. 10A illustrates one view of the holder as an independent unit, in accordance with an embodiment of the invention.
Figure 10B:
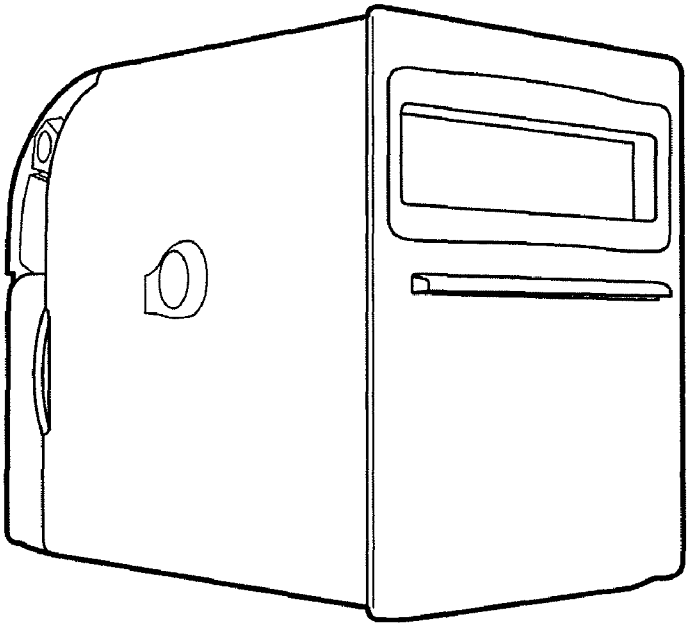
FIG. 10B illustrates another view of the holder as an independent unit, in accordance with an embodiment of the invention.

To sum up, the new front panel complies with the dimensional requirements of the main body, it has no "vanes" for attachment to the VM and features a proper anti-slippery base—e.g. rubber supports—which allow for easy operation (FIG. 10).

GLOSSARY

ABS: acronym for Acrylonitrile Butadiene Styrene, very resistant plastic widely used by the electronic and automobile industry.

Assembly of the electronic device: assembly of the holder and placement of the different inner components.

Coin mechanism: a device which recognizes and stores coins, which can be credited in a vending machine to purchase goods or services.

Consumer: user who performs a transaction in front of a machine.

DEX/UCS: data transfer protocol between a vending machine and an external device. For further details see *EVA-DTS Protocol. Data Transfer Standard. EVA* (*European Vending Association*), *Version* 6.0, May 2004

LCD: acronym for "Liquid Crystal Display", an electrical system which permits displaying data on the basis of liquid crystals.

Machine: see vending machine.

MDB: a communication protocol between the controller of a vending machine and the peripherals which compose it (coin mechanism, etc.). For further details see *MDB Protocol. Multi-Drop Bus/Internal Communication Protocol. MDB/ICP. NAMA* (*National Automatic Merchandising Association*). *Version* 3.0, 26 Mar. 2003.

Polycarbonate: group of thermoplastics, widely used by the safety industry (anti-bullet glass and police anti-riot shields) and with design and architecture purposes.

Vending machine: self-service machine for the sale of products.

VM: see vending machine.

The invention claimed is:

1. A holder of an electronic device which allows for multiple functions on a vending machine, comprising:

a support for printer paper;

a back lower cover;

an upper back cover;

a main body;

an anti-vandal front panel; and an antenna located in an inner frontal and central part of the holder.

2. The holder of claim 1, further comprising a paper guide having a first conic section inside the main body and a second conic section on the anti-vandal front panel, wherein the two conic sections are unaligned.

3. The holder of claim 2, wherein the anti-vandal front panel includes a paper exit slot connected to the second conic section.

4. The holder of claim 1, wherein the main body is removeably fixed to the back lower cover, the upper back cover, and the anti-vandal front panel via clip-like sockets and the main body protects and holds a plurality of internal components.

5. The holder of claim 1, wherein the anti-vandal front panel includes a consumer interface.

6. The holder of claim 1, wherein the electronic device includes a mother board and wherein two screws fix the printer paper support to a printer, four screws fix the anti-vandal front panel to the vending machine, and four rivets fix the mother board in position.

7. A holder of an electronic device which allows for multiple functions, comprising:

a support for printer paper having a base and a plurality of side parts, wherein the base and side parts indicate a location for insertion of a paper roll;

a back lower cover;

an upper back cover;

a front panel;

a main body, wherein the main body is removeably fixed to the back lower cover, the upper back cover; and the front panel; and an antenna located in an inner frontal and central part of the holder, wherein the holder is a fixed and independent unit of a vending machine.

8. The holder of claim 7, wherein the upper back cover pivots relative to the back lower cover to allow access to support for printer paper.

* * * * *